(12) United States Patent
Thomassen

(10) Patent No.: US 11,179,009 B2
(45) Date of Patent: Nov. 23, 2021

(54) BODYCARE DEVICE

(71) Applicant: KONINKLIJKE PHILIPS N.V., Eindhoven (NL)

(72) Inventor: Henricus Johannes Maria Thomassen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 719 days.

(21) Appl. No.: 15/307,911

(22) PCT Filed: Apr. 23, 2015

(86) PCT No.: PCT/EP2015/058770
§ 371 (c)(1),
(2) Date: Oct. 31, 2016

(87) PCT Pub. No.: WO2015/169606
PCT Pub. Date: Nov. 12, 2015

(65) Prior Publication Data
US 2017/0049278 A1    Feb. 23, 2017

(30) Foreign Application Priority Data
May 6, 2014    (EP) .................................... 14167168

(51) Int. Cl.
*A47K 7/04*    (2006.01)
*A61H 7/00*    (2006.01)
(Continued)

(52) U.S. Cl.
CPC ............ *A47K 7/043* (2013.01); *A46B 5/0095* (2013.01); *A46B 7/04* (2013.01); *A46B 13/008* (2013.01);
(Continued)

(58) Field of Classification Search
CPC . A61H 1/00; A61H 7/00; A61H 7/002; A61H 7/003; A61H 7/004; A61H 7/005;
(Continued)

(56) References Cited

U.S. PATENT DOCUMENTS 2,234,102 A * 3/1941 Andres ................ A61H 9/005
                                                601/101
4,512,339 A * 4/1985 McShirley ......... A61H 23/0218
                                                310/23
5,593,381 A * 1/1997 Tannenbaum ..... A61H 23/0218
                                                601/101
7,282,037 B2 * 10/2007 Cho .................... A61H 23/0218
                                                601/15
(Continued)

FOREIGN PATENT DOCUMENTS

CN        1518433 A      8/2004
CN       201750912      2/2011
(Continued)

*Primary Examiner* — Timothy A Stanis
*Assistant Examiner* — Matthew R Moon

(57) ABSTRACT

A skincare device such as a facial skincare device performs a skincare procedure on a subject, in a series of zones of the skin of the subject, with each zone receiving a different skincare routine. The device has an interchangeable treatment head to perform the skincare procedure. A controller controls the treatment head to perform the skincare procedure. A sensor detects an individual treatment head when fitted to the device, by detecting and reading data from a tag on the treatment head, which automatically selects the sequence of skincare routines to be performed by the device on the zones of the skin of the subject.

20 Claims, 7 Drawing Sheets

(51) Int. Cl.
  *A46B 15/00* (2006.01)
  *A61H 23/02* (2006.01)
  *A46B 7/04* (2006.01)
  *A46B 5/00* (2006.01)
  *A46B 13/00* (2006.01)
  *A46B 13/02* (2006.01)
  *A61C 17/22* (2006.01)
  *H04M 1/72415* (2021.01)

(52) U.S. Cl.
  CPC ........ *A46B 13/023* (2013.01); *A46B 15/0006* (2013.01); *A61H 7/005* (2013.01); *A61H 23/0254* (2013.01); *A46B 2200/102* (2013.01); *A61C 17/221* (2013.01); *A61H 2201/0153* (2013.01); *A61H 2201/1215* (2013.01); *A61H 2201/1481* (2013.01); *A61H 2201/1671* (2013.01); *A61H 2201/1685* (2013.01); *A61H 2201/501* (2013.01); *A61H 2201/5007* (2013.01); *A61H 2201/5038* (2013.01); *A61H 2201/5058* (2013.01); *A61H 2205/022* (2013.01); *H04M 1/72415* (2021.01)

(58) Field of Classification Search
  CPC .... A61H 23/00; A61H 23/02; A61H 23/0218; A61H 23/0254; A61H 2201/0107; A61H 2201/12; A61H 2201/1207; A61H 2201/1215; A61H 2201/14; A61H 2201/1481; A61H 2201/1657; A61H 2201/1671; A61H 2201/1683; A61H 2201/1685; A61H 2201/50; A61H 2201/5007; A61H 2201/501; A61H 2201/5038; A61H 2201/5058; A61H 2201/022; H04M 1/72533; A46B 5/0095; A46B 7/04; A46B 13/008; A46B 13/023; A46B 15/0006; A46B 2200/102; A47K 7/046; A61C 17/221
  See application file for complete search history.

(56) References Cited

U.S. PATENT DOCUMENTS

| | | | |
|---|---|---|---|
| 7,306,570 B1* | 12/2007 | Julian | A61H 7/007 |
| | | | 601/134 |
| 7,448,109 B2 | 11/2008 | Brewer | |
| 7,774,886 B2 | 8/2010 | Hilscher | |
| 8,468,634 B2* | 6/2013 | Iwahori | A61C 17/3481 |
| | | | 15/22.1 |
| 9,872,813 B2 | 1/2018 | Giraud | |
| 2005/0142093 A1* | 6/2005 | Skover | A61B 17/54 |
| | | | 424/70.14 |
| 2008/0209650 A1 | 9/2008 | Brewer | |
| 2011/0015463 A1* | 1/2011 | Legendre | A45D 40/00 |
| | | | 600/9 |
| 2011/0039229 A1* | 2/2011 | Senia | A61C 1/052 |
| | | | 433/131 |
| 2011/0040235 A1* | 2/2011 | Castel | A61F 7/00 |
| | | | 604/20 |
| 2011/0106067 A1 | 5/2011 | Geva | |
| 2012/0186031 A1* | 7/2012 | Dombro | A46B 13/02 |
| | | | 15/88.2 |
| 2013/0144280 A1 | 6/2013 | Eckhouse | |
| 2014/0031726 A1* | 1/2014 | Chernomorsky | A61B 17/24 |
| | | | 601/2 |
| 2014/0366288 A1* | 12/2014 | Grez | A46B 15/001 |
| | | | 15/22.1 |
| 2014/0367131 A1* | 12/2014 | Grez | A46B 13/00 |
| | | | 173/6 |
| 2015/0305969 A1* | 10/2015 | Giraud | A61H 7/005 |
| | | | 601/18 |
| 2016/0284208 A1* | 9/2016 | Pfenniger | A61C 17/224 |

FOREIGN PATENT DOCUMENTS

| | | |
|---|---|---|
| CN | 202459228 U | 10/2012 |
| CN | 203564165 U | 4/2014 |
| EP | 1844732 A1 | 10/2007 |
| WO | 02071970 A1 | 9/2002 |
| WO | 2014009177 A1 | 1/2014 |

* cited by examiner

BODYCARE DEVICE

This application is the U.S. National Phase application under 35 U.S.C. § 371 of International Application No. PCT/EP2015/058770, filed on Apr. 23, 2015, which claims the benefit of International Application No. 14167168.5 filed on May 6, 2014. These applications are hereby incorporated by reference herein.

FIELD OF THE INVENTION

The present invention relates to a bodycare device, which may be used for example to perform a skincare procedure such as a facial skincare procedure.

BACKGROUND OF THE INVENTION

Bodycare devices such as skincare devices may have an interchangeable head and a drive train to rotate and/or vibrate the head so as to perform different skincare operations such as pore cleansing, exfoliating and brushing. An example is described in WO2014009177A1. The drive train provides a driving action that can be selected by the user to take account of the treatment head fitted to the device.

US 2008/209650 describes an oral hygiene devices employing an ultrasound transducer are disclosed. The device is user-activatable to commence an operating cycle, and has a controller that may provide a timing function and may provide a variable level of ultrasound transducer output during an operating cycle. The controller may provide a monitoring function that is capable of detecting an ultrasound transducer fault condition and alert a user, through a user interface, when an ultrasound transducer fault condition is detected. The controller may be programmed to count the number of device operating cycles or accumulate the total device operating time and activate a transducer replacement signal following a predetermined number of uses or a predetermined accumulated operating time. The ultrasound transducer assembly may be provided in operative communication with an ultrasound drive circuit and power supply by means of a transformer assembly that inductively couples and transfers power from the ultrasound drive circuit to the ultrasound transducer.

WO 2002/071970 describes a method and device for cleaning teeth, whereby different cleaning implements for the personalized cleaning of teeth are coupled to a common operating part. WO 2002/071970 particularly relates to a handpiece of an electric tooth cleaning device comprising a coupling part for coupling different cleaning implements thereto, and to the cleaning implements themselves. According to WO 2002/071970, the handpiece detects a coding provided on the respectively coupled cleaning implement. Different functions of the tooth cleaning device are controlled according to the respectively detected coding of WO 2002/071970.

It is known from EP 1367958 to provide heads of a toothbrush with an RFID tag to change the brushing action when a head is changed. However, the same drive action is performed for a particular head and the drive action only changes when the head is changed for another.

SUMMARY OF THE INVENTION

According to an aspect of the invention, a bodycare device (herein also indicated as "device") is provided for performing a bodycare procedure, especially a skincare procedure, on a subject, comprising: a drive train to receive and drive an interchangeable treatment head (herein also indicated as "treatment head") to perform the skincare procedure; a controller to control the drive train so that the treatment head performs the skincare procedure, and a sensor to detect an individual treatment head when fitted on the drive train, the controller being responsive to the sensor to control the drive train to perform the skincare procedure in a sequence of individual skincare routines suited to respective zones of the body (herein also indicated as "body zones" or "zones") of the subject in dependence on the individual treatment head fitted to the drive train, as further defined in the accompanying claims. The term "bodycare device" may especially refer to a skincare device.

The bodycare device has the advantage of enabling different bodycare procedures, especially skincare procedures, that comprise individual sequences of bodycare routines, especially skincare routines, suited to respective zones of the body of the subject in dependence on the individual treatment head fitted to the drive train. The bodycare device may comprise a skincare device such as a facial skincare device which allows a sequence of individual skincare routines suited to respective zones of the skin of the subject to be carried out in dependence on the individual treatment head utilised.

The sensor may be configured to wirelessly detect an identity device on the treatment head fitted to the drive train, and for example the sensor can includes a NFC device configured to detect a RFID tag on the treatment head. The wireless detection facilitates interchange of the treatment heads.

The drive train can include a drive shaft to receive the interchangeable treatment head, a motor configuration to rotate the drive shaft and/or apply a vibratory motion to the drive shaft. The motor configuration may comprise a first motor coupled to rotate the drive shaft, and a second motor that comprises a drive coil and a magnetic member configured to impart a vibratory motion to the drive shaft. This facilitates driving the treatment head fitted to the shaft in different individual bodycare routines, especially skincare routines, in dependence on the individual treatment head fitted to the drive train.

Alternative motor configurations to rotate and/or apply a vibratory motion to the drive shaft of the drive train can be used. For example, vibratory motion applied to the drive train need not necessarily be produced by a second motor and a mechanical arrangement may be provided so that on rotation of the shaft, it is subject to a hammer action to produce the vibratory motion. Also, a vibrating plate may be used to impart the vibratory motion to the shaft.

Conveniently, the controller is operable to control the motor configuration so as to control drive parameters for the drive train for each of the bodycare routines, especially skincare routines, individually. The drive parameters can include the speed or direction of rotation of the drive train, the frequency or amplitude of the vibratory motion of the drive train, a modulation applied to the vibratory motion, or the duration of each of the bodycare routines, especially skincare routines, individually.

These drive parameters facilitate a wide range of different body care routines to be carried out for respective zones of the skin of the subject in dependence on the individual treatment head fitted to the drive train to perform a particular bodycare procedure, especially skincare procedure, such as pore cleansing, exfoliating, massaging or brushing.

The controller may have an associated memory with stored values for the drive parameters of the sequence of individual bodycare routines, especially skincare routines, suited to respective zones of the skin of the subject for the individual treatment heads when fitted to the drive train. Furthermore, the controller may be configured in response to the sensor providing a signal corresponding to a particular treatment head, to retrieve the stored values of the drive parameters for the detected treatment head from the memory, and control the drive train to perform the sequence of individual bodycare routines, especially skincare routines, suited to respective zones of the body of the subject in accordance with the drive parameters retrieved from the memory for the particular treatment head.

This has the advantage that the drive parameters for use in driving the individual bodycare routines, especially skincare routines, can be obtained in response to fitting a particular head onto the drive train.

The bodycare device may be provided with at least one said interchangeable treatment head, with the advantage that different procedures such as skincare procedures can be carried out such as such as pore cleansing, exfoliating, massaging or brushing.

The invention also includes a computer program to be run by a processor to be coupled to the bodycare device to control selectively the drive parameters stored in the memory for the individual treatment head, as further defined in the accompanying claims. The term "computer program" may especially refer to a computer program product.

In this way, the user can edit or adapt the routines according to their preferences or to accommodate updates.

Advantageously, the computer program may be configured to be run by a mobile communication device to wirelessly communicate with the bodycare device to control selectively the drive parameters stored in the memory for the individual treatment head and/or communicate with a remote data source to update or modify user preferred stored values of the drive parameters. Conveniently, the computer program can comprise an app for a computing device such as a Smartphone or a mobile tablet computer, to be wirelessly connected to the bodycare device for example by NFC communication or Wi-Fi, which comprises a user friendly way of editing or updating the bodycare routines, especially skincare routines.

In yet a further aspect, the invention provides a bodycare device for performing a bodycare procedure, especially a skincare procedure, on a subject, comprising:

a drive train to receive and drive an interchangeable treatment head to perform the bodycare procedure, especially the skincare procedure, wherein the drive train especially includes a drive shaft to receive the interchangeable treatment head, and a motor configuration (especially configured) to rotate the drive shaft and/or apply a vibratory motion to the drive shaft;

a controller to control the drive train so that especially the treatment head performs one or more (predetermined) bodycare routine(s), especially one or more (predetermined) skincare routine(s), associated with the treatment head; and a sensor to detect the (respective) treatment head when fitted on the drive train;

the controller being responsive to the sensor to control the drive train to perform the one or more (predetermined) bodycare routine(s), especially the one or more (predetermined) skincare routine(s) associated with the (respective) treatment head; wherein the controller in a specific embodiment has an associated memory with stored values for the drive parameters of at least one different treatment head, even more especially at least two different treatment heads, especially at least three different treatment heads, even more especially at least four different treatment heads, wherein especially each routine comprises (routine specific) drive parameters.

A treatment head may be configured to be used for different routines at a specific predetermined body zone. Alternatively or additionally, a treatment head may also be configured to be used for different routines at different body zones.

Hence, the bodycare device is especially configured to execute different skincare routines, wherein each skincare routine may be associated with a respective treatment head. When the user changes the treatment head, the bodycare device recognizes the treatment head and will derive from the memory the drive parameters for the treatment head actually received by the drive train.

Therefore, the bodycare procedure, especially the skincare procedure, comprises at least a single bodycare routine, especially at least a single skincare routine, more especially however, at least two routines. The term "routine" herein may thus especially refer to a bodycare routine, more especially a skincare routine, respectively.

In this way, a sequence of individual bodycare routines, especially skincare routines, may be executed. This sequence may be predetermined and/or may be defined by the user.

Hence, in an embodiment the sequence may be indicated by the device. In this way, the device may indicate that another body zone has to be subjected to a next routine, with the same treatment head, or with another treatment head.

Hence, in a further embodiment by exchanging a first treatment head by a desired second treatment head, already a sequence may be defined. Hence, in embodiments the bodycare device may be configured to perform the bodycare procedure, especially the skincare procedure, in a sequence of routines, which sequence may be predetermined or which sequence may be defined by the user.

Further, the bodycare device may also be configured to offer the user a predetermined sequence, which may (during use) be changed by the user (when desired). For instance, the user may decide to use only a first and a third treatment head, and skip the second treatment head with its associated routine. Or the user may decide to run only a first routine and a third routine (with the same treatment head), and skip the second routine.

In yet another embodiment, the device may be configured to offer a sequence. For instance, the device may be configured to provide an indication on a display and/or a sound signal, which may be an indication to the user to address with the same treatment head another body zone (with a respective routine). Alternatively or additionally, the device may be configured to provide an indication on a display and/or a sound signal, which may be an indication to the user to address with the same treatment head the same body zone, but with another routine (than the previous routine). Yet alternatively or additionally, the device may be configured to provide an indication on a display and/or a sound signal, which may be an indication to the user to address with another treatment head the same body zone (with a respective routine). Yet alternatively or additionally, the device may be configured to provide an indication on a display and/or a sound signal, which may be an indication to the user to address with another treatment head the another body zone (with a respective routine).

Hence, the associated memory may include stored values for the drive parameters of at least two body care routines, especially at least two skincare routines, especially at least three routines, even more especially at least four routines.

These routines may in embodiments e.g. be associated with the same treatment head, but for different body zones. Alternatively or additionally, these routines may in embodiments e.g. be associated with different treatment heads for one (or more different) body zone(s). Yet alternatively or additionally, these routines may in embodiments e.g. be associated with the same treatment head, but for the same body zone(s), but with different routines, etc.

In an embodiment, the controller is responsive to the sensor to control the drive train to perform the body care procedure, especially the skincare procedure, in a sequence of individual body care routines, especially skincare routines, suited to respective (one or more) zones of the body of the subject (in dependence on the individual treatment head fitted to the drive train).

In a further embodiment, the controller is further operable to control the motor configuration so as to control drive parameters for the drive train for each of the respective body care routines, especially skincare routines, and wherein the controller has an associated memory with stored values for the drive parameters of the sequence of respective body care routines, especially skincare routines, suited to respective (one or more) zones of the skin of the subject (in dependence on the individual treatment head fitted to the drive train).

Hence, for instance, one may first treat with the treatment head a right cheek, followed by the left cheek (with the same treatment head), and thereafter the forehead, with the same or another treatment head. The routines for the different zones may be individual routines, e.g. the rotation direction may differ for the right and left cheek.

Additionally, the associated memory may include stored values for the drive parameters for different body care routines, especially different skincare routines, with the same treatment head.

The associated memory especially includes stored values for the drive parameters of at least two body care routines, especially at least two skincare routines, which are associated with predetermined zones of the body, especially predetermined zones of the skin. Hence, each treatment head may be configured to be used in one or more bodycare routine(s), especially one or more skincare routine(s), to a predetermined zone, or to a plurality of predetermined treatment zones. A manual with the bodycare device, and/or information on a display integrated in the bodycare device, may indicate which treatment head is designed for which body zone(s) (especially skin zone(s)) and/or which routine (s).

Further, the associated memory may include stored values for the drive parameters of at least two bodycare procedures, especially at least two skincare procedures. Each procedure may especially include at least two different routines (optionally to be used with different treatment heads).

Though the bodycare device may be configured to execute different routines with the same or with different treatment heads, the user may also use the bodycare device with only one treatment head for only one routine, or especially for more than one routine, such as a plurality or routines for different body zones with the same treatment head. Of course, would another treatment head be used for these same different body zones, the routines (from the memory) may be different.

The term "zone" may for instance refer to a predetermined zone, such as known in the art and/or as defined by e.g. the producer of the bodycare device (and/or treatment head). Hence, zones known in the art are e.g. the nose, the cheeks (left cheek/right cheek), the chin, the periorbital region, the forehead, etc. etc., and when referring to other parts of the body than the head, zones known in the art are the arms, chest, buttocks, hops, back, thighs, legs, feet, etc. etc. The term "part of the body" or "body part" or "zone of the body", etc., especially refers to a skin part.

Advantageously, the present invention allows e.g. a more sensitive part of the body, especially the skin, such as the periorbital region, to be treated with a more sensitive routine, whereas a less sensitive part, such as the chin, may be treated with a less sensitive routine. For instance, rotation speed and/or vibration amplitude and/or vibration frequency may be lower/smaller in the case of a more sensitive part of the body and may be higher/larger in the case of a less sensitive part of the body. Likewise, the relevant treatment head may e.g. be relatively less abrasive or brushing (at the same drive parameters) for such (predetermined) zone than another treatment head configured for a (predetermined) less sensitive zone. In this way, e.g. a more gentle or more vigorous massage may be provided with the body care device, e.g. by choosing the routine and/or treatment head, especially at least the routine. Further, the routine may also include definitions for the rotation direction, in addition to definitions for one or more of rotation speed, vibration amplitude, and vibration frequency.

As indicated above, a routine especially includes a set of specific drive parameters, especially associated with a predetermined body zone, especially skin zone, and especially associated with a predetermined treatment head.

The present bodycare device is herein especially described in relation to a skincare device. Further, the bodycare procedure, especially skincare procedure, may be applied with the bodycare device with the user bringing the device into contact with the respective body zone, especially skin zone, when the relevant treatment head is associated (received) with the bodycare device.

The invention further provides a kit of parts comprising the body care device and a treatment head, especially at least two different treatment heads, especially at least three different treatment heads, even more especially at least four different treatment heads These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF EMBODIMENTS

Figure 1:
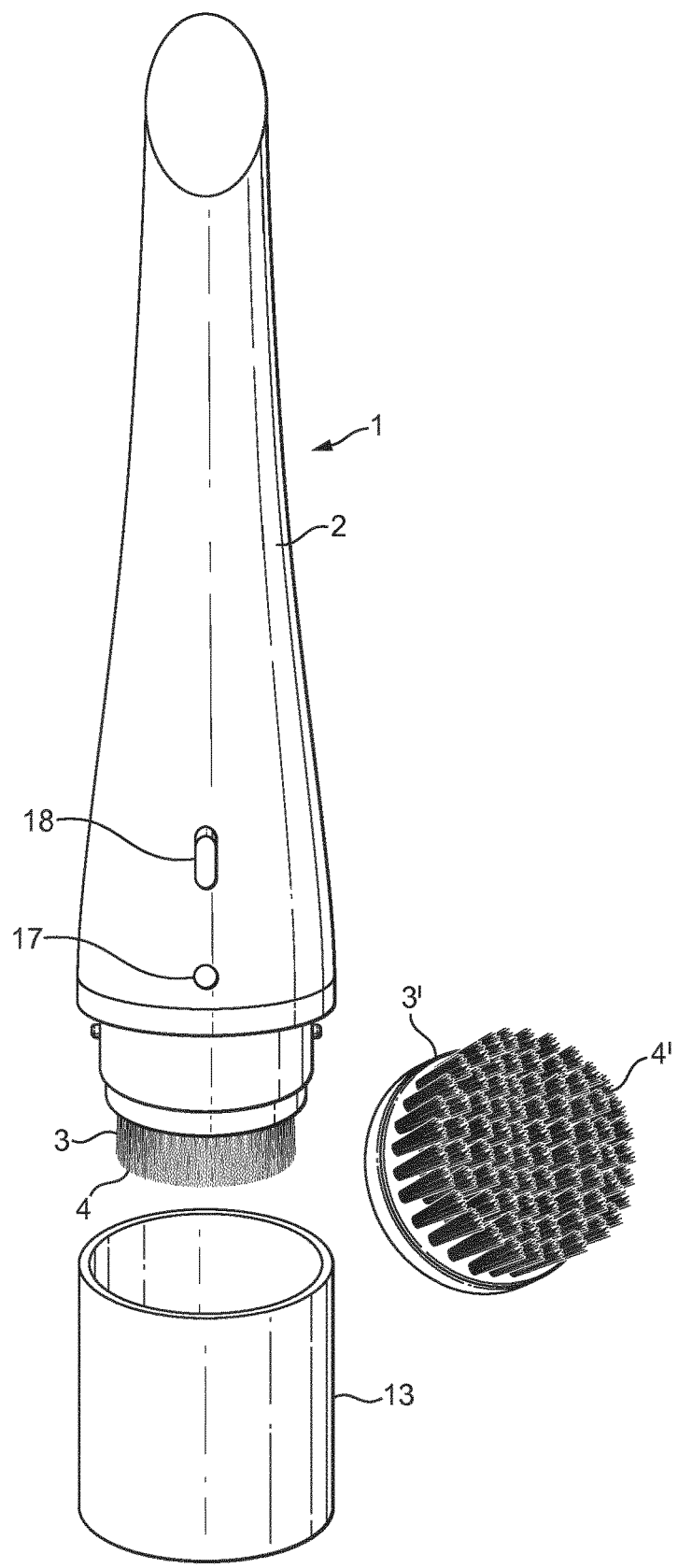
FIG. 1 is a schematic perspective view of a facial skincare device, with a charging cradle and interchangeable head.
Figure 2:
FIG. 2 is a schematic illustration of the facial skincare device in use by a subject.

Referring to FIG. 1, a handheld bodycare device 1 has a waterproof housing 2 together with a rotary and vibratory treatment head 3 that can be applied to the skin of a subject to perform a skincare procedure as illustrated schematically in FIG. 2. Herein, the bodycare device 1 is further also indicated as skincare device 1.

The treatment head 3 is interchangeable and may comprise a skincare scrubbing element such as a brush with bristles 4 suited to perform a particular skincare procedure, such as pore cleansing, exfoliating, massaging or brushing, with the bristles being selected to suit normal, sensitive or extra-sensitive skin. Thus, the treatment head 3 shown in FIG. 1 may be replaced by interchangeable treatment head 3' with bristles 4' suited to perform a different skincare procedure to the treatment head 3.

Figure 3:
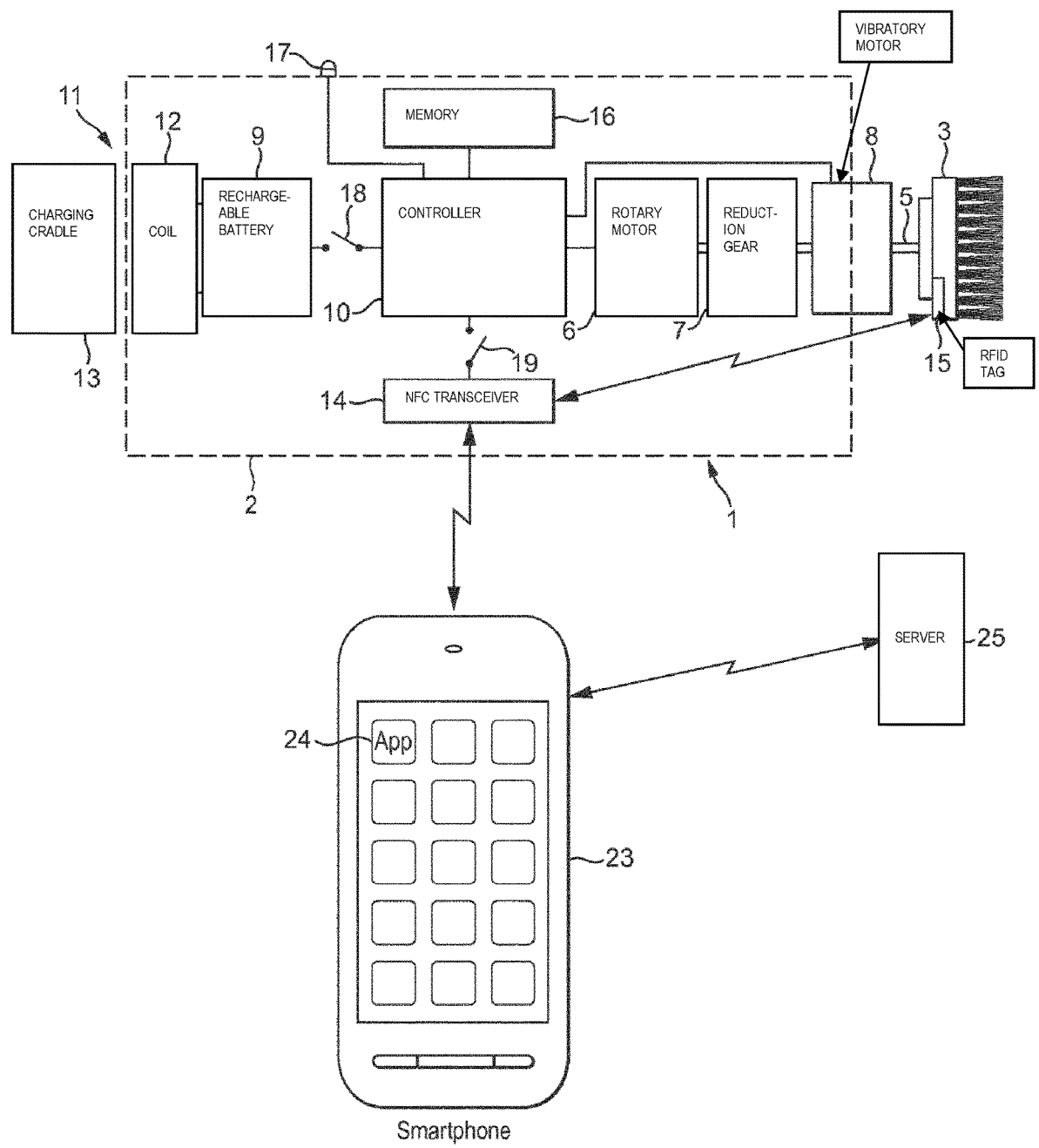
FIG. 3 is a schematic block diagram of the major components of the facial skincare device, and a Smartphone for programming operational characteristics of the device.

As shown in FIG. 3, the interchangeable treatment head 3 is received on a drive shaft 5 which is driven by a drive train which may include a first electric motor 6, a reduction gear 7 and a second electric motor 8. The first electric motor 6 rotates the drive shaft 5 through the reduction gear train 7, and the second, vibratory motor 8 imparts a vibratory motion to the drive shaft 5 in addition to the rotation produced by the first motor 6. The first and second motors 6, 8 receive respective electrical drive currents from a rechargeable battery 9 under the control of a microcontroller 10. The rechargeable battery 9 is charged through an inductive charger 11 which includes an inductive coil and rectifier arrangement 12 within the housing 2, which is inductively coupled to an AC driven coil within a charging cradle 13 illustrated in FIG. 1, in which the device is received when not in use. The charging arrangement may operate generally in the manner of the charger provided for the VisaPure facial cleaning brush manufactured and sold by Royal Philips N.V.

Referring to FIG. 3, the housing 2 includes a wireless transceiver, typically in the form of a near field communication (NFC) transceiver 14 which acts as a sensor to detect the identity of the interchangeable treatment head 3 when fitted to the drive shaft 5. To this end, the treatment head 3 is provided with an identity tag in the form of a RFID passive tag 15 attached to the treatment head 3. However, it will be appreciated that an active RFID tag could be used.

The microcontroller 10 has an associated memory 16 which stores data corresponding to a series of drive parameters that are selected by the microcontroller to control operation of the motor configuration 6, 8 to perform the skincare procedure which specifically corresponds to the identity of the treatment head 3 fitted on the drive shaft 5.

The device also includes a signalling device in the form of a LED 17 and an on/off switch 18 for the entire device, together an on/off switch 19 for the NFC transceiver 14 to conserve power when the treatment head has been fitted to the device 1.

Figure 5:
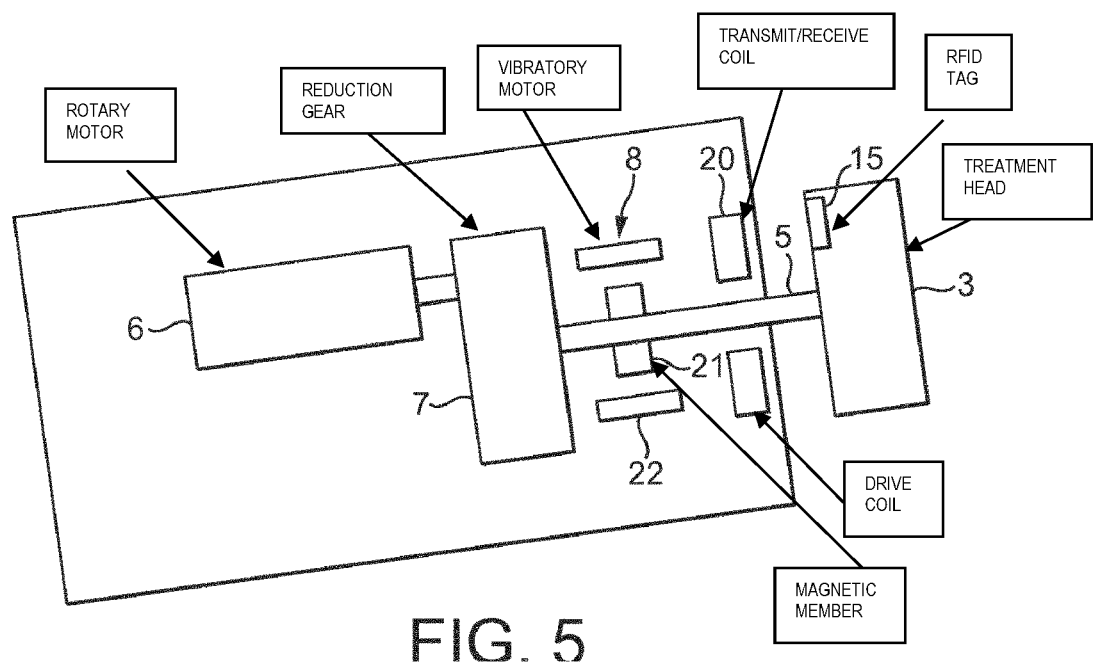
FIG. 5 is a sectional view of the motor configuration, gear train and treatment head of the skincare device.

The configuration of the first and second motors 6, 8 and the reduction gear 7 is illustrated in more detail in FIG. 5. The motor 6 runs continuously in operation and transmits to torque through the reduction gear 7 to the rotary drive shaft 5, onto which the treatment head 3 is received at one end with a push-fit (the bristles 4 of the treatment head being omitted in FIG. 5 for purposes of clarity). The NFC transceiver 14 has an associated transmit/receive coil 20 which communicates with the RFID tag 15 on the treatment head 3, so as to ascertain the identity of the treatment head fitted to the shaft 5.

The second motor 8 imparts a longitudinal, axial, vibratory motion to the drive shaft 5, in addition to the rotation of the shaft produced by the first motor 6. The second motor includes a flux assembly or magnetic member 21 which cooperates with a drive coil or solenoid 22 that receives current from the microcontroller 10 to impart a vibratory motion to the drive shaft 5. A more detailed explanation of the construction and operation of the first and second motors 6, 8 can be found in WO2014009177A1.

Alternative motor configurations to rotate and/or apply a vibratory motion to the drive shaft 5 of the drive train are possible. For example, the vibratory motion applied to the drive train need not necessarily be produced by the second motor 8. Instead, a mechanical arrangement may be provided so that on rotation of the shaft 5, it is subject to a hammer action axially so as to produce the vibratory motion. Alternatively, a vibrating plate may impart the vibratory motion to the shaft 5.

Figure 4:
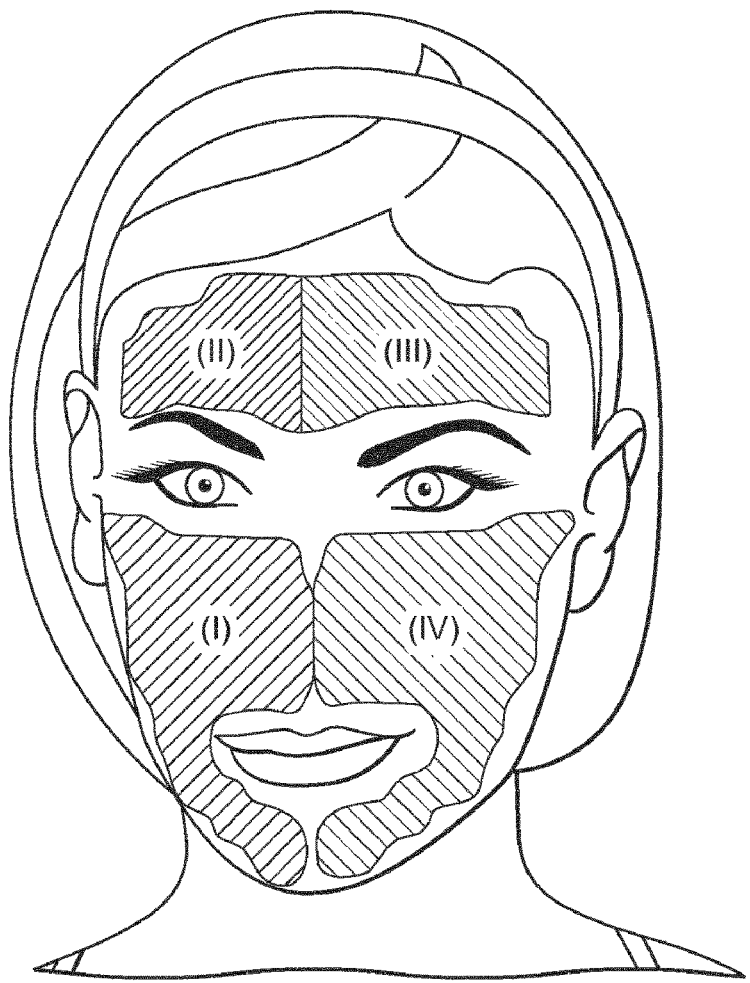
FIG. 4 illustrates different zones of the face of the user.

In use, the skincare device 1 performs a skincare procedure in a sequence of individual skincare routines suited to respective zones of the skin of the subject in dependence on the individual treatment head fitted to the drive shaft 5. For this example of the facial skincare device 1, the subject's face is considered to consist of zones I, II, III, IV as illustrated in FIG. 4 and an individual skincare routine is performed using the treatment head 3 for each of the zones in a predetermined sequence. It will however be appreciated that the device may be configured to work on more or less than four such facial zones.

Figure 6:
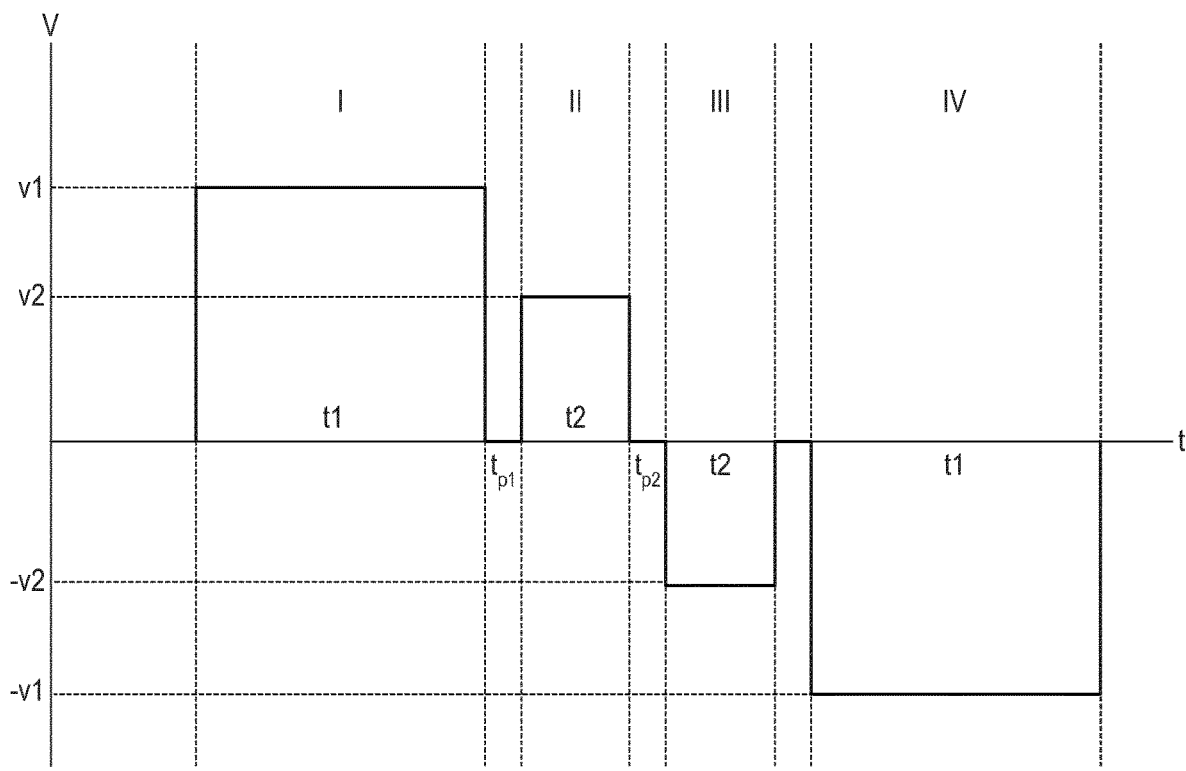
FIG. 6 is a graph of motor speed as a function of time for different, individual skincare routines.
Figure 7:
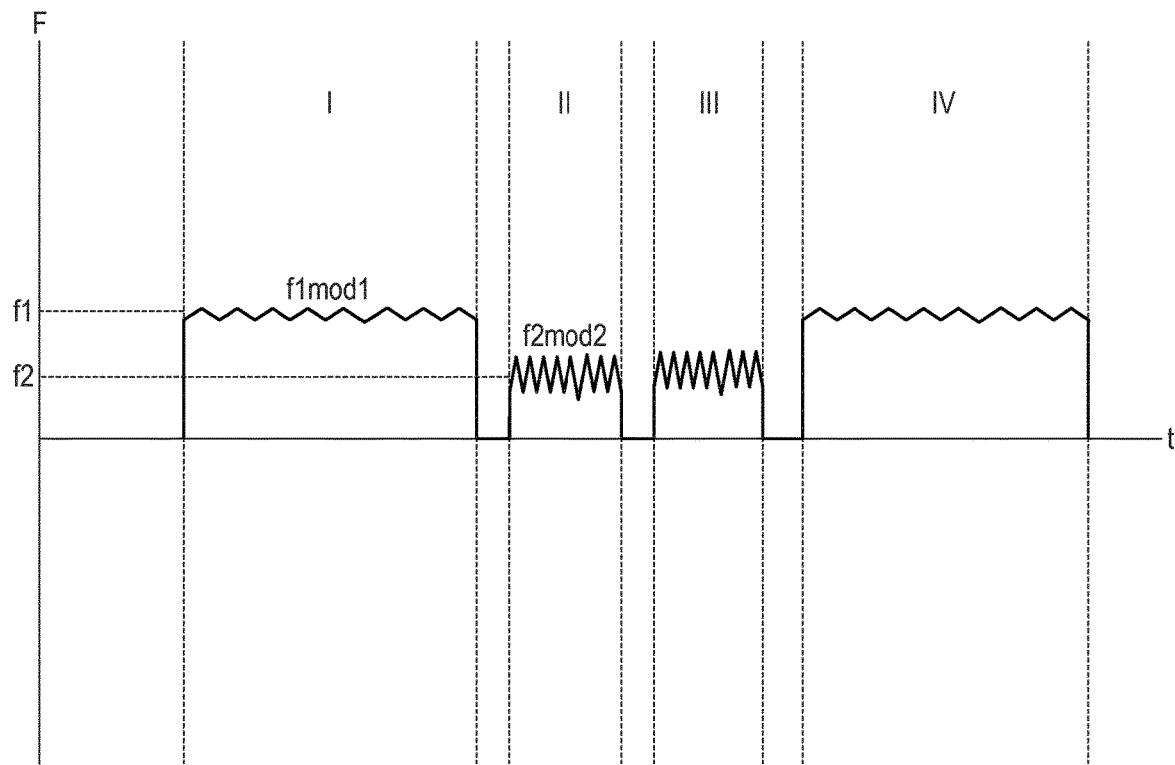
FIG. 7 is a graph of vibration frequency and modulation as a function of time for different, individual skincare routines.

Drive parameters used for the motors 6, 8 to perform the treatment routines for the individual zones I, II, III, IV are illustrated in FIGS. 6 and 7. For zone I, the treatment head 3 is driven by the first motor 6 at speed $v_1$, for a time $t_1$. Also, as shown in FIG. 7 the vibration produced by the second motor 8 has a frequency $f_1$. The frequency may be modulated with a modulation $f_1 \, mod_1$.

When the treatment routine has been completed for zone I, the motors 6, 8 pause for a time $t_{p1}$ to allow the user to move the treatment head 3 to perform a treatment routine specifically configured for zone II. The motors 6, 8 then run for a period $t_2$, with the first motor 6 driving the treatment head 3 at a speed $v_2$ which is different from $v_1$, and motor 8 imparts a vibration of frequency $f_2$ modulated with a modulation $f_2 \, mod_2$.

When the treatment routine has been completed for zone II, the motors 6, 8 pause for a time tp2 to allow the user to move the treatment head to perform a treatment routine specifically configured for zone III. As shown in FIG. 6, the direction of rotation of the treatment head is reversed for zone III and IV, which is signalled by a drive parameter s=1 for zones I and II and s=−1 for zones III and IV. It will appreciated that the pair of zones I and IV and zone pair II and III are symmetrically disposed on the subject's face and so the same routines can be applied to the zone pairs but with the motor 6 running in opposite directions of rotation.

A set of drive parameters that can be stored in the RFID tag 15 are shown in TABLE 1

| parameter | description |
| --- | --- |
| t1 [s] | time for facial zone (I) & (IV) |
| t2 [s] | Time for facial zone (II) & (III) |
| tmod1 [s] | Modulation period time for facial zone (I) & (IV) |

-continued

| parameter | description |
| --- | --- |
| tmod2 [s] | Modulation period time for facial zone (II) & (III) |
| tmod1 [s] | Modulation period time for facial zone (I) & (IV) |
| tmod2 [s] | Modulation period time for facial zone (II) & (III) |
| s [—] | Rotation direction change between zone (II) & (III) |
| v1l [rpm] | Low rotation speed for facial zone (I) & (IV) |
| v2l [rpm] | Low rotation speed for facial zone (II) & (III) |
| f1l [hz] | Low vibration frequency for facial zone (I) & (IV) |
| f2l [hz] | Low vibration frequency for facial zone (II) & (III) |
| fmod1l [—] | Low modulation frequency range for facial zone (I) & (IV) |
| fmod2l [—] | Low modulation frequency range for facial zone (II) & (III) |
| v1h [rpm] | High rotation speed for facial zone (I) & (IV) |
| v2h [rpm] | High rotation speed for facial zone (II) & (III) |
| f1h [hz] | High vibration frequency for facial zone (I) & (IV) |
| f2h [hz] | High vibration frequency for facial zone (II) & (III) |
| fmod1h [—] | High modulation frequency range for facial zone (I) & (IV) |
| fmod2h [—] | High modulation frequency range for facial zone (II) & (III) |
| gen | Device generation for which attachment is valid |
| attId | Attachment identifier to specify the type of attachment |

Data for the parameters shown in Table 1 may be stored in terms of a maximum value, minimum value, step size and number of steps to allow control of the individual treatment routines for the zones.

Figure 8:
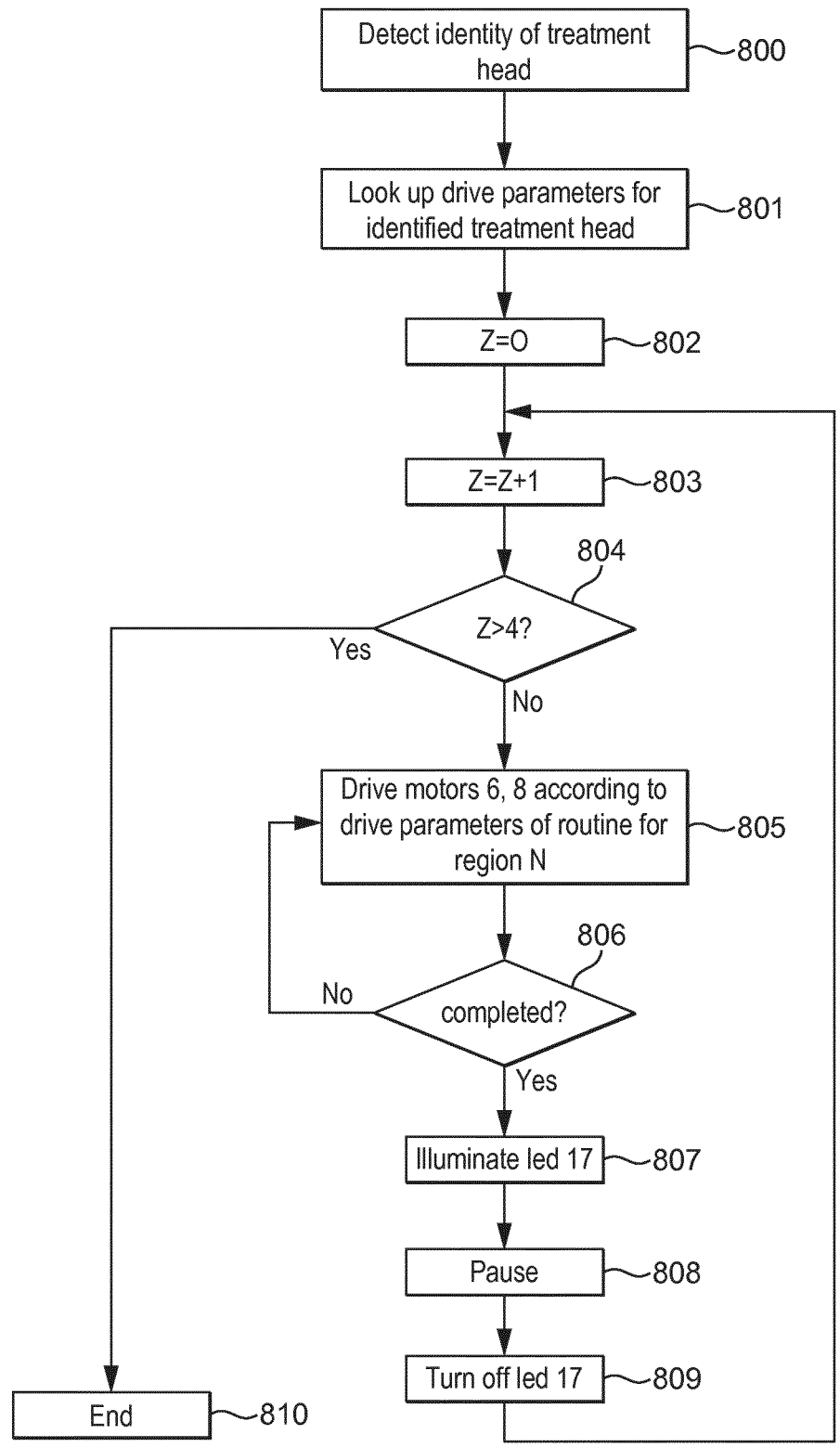
FIG. 8 is a flow diagram of a routine performed by a microcontroller in the device.

FIG. 8 shows a process performed by the microcontroller 10 to perform the treatment routines of the skincare procedure for the respective zones I-IV. At step 800 the fitting of a treatment head 3 to the drive shaft 5 is detected by the transceiver 14 detecting the RFID tag 15.

At step 801, the drive parameters for the treatment head 3 fitted to the drive shaft are looked up, either by reading them from the data stored on the RFID tag by means of transceiver 14 or, if they have previously been stored in the memory 16, by retrieving them from the memory.

A zone count parameter Z is initially set to zero at step 802 and then incremented at step 803. The zone parameter has a maximum value corresponding to the number of treatment zones, in this example four, which is tested at step 804.

At step 805 the first and second drive motors 6, 8 are operated with the drive parameters for the treatment zones individually. Completion of the routine for a particular zone is tested at step 806. For example for zone I, when the motors 6, 8 have run for a time $t_1$, they are paused at step 807 for a time $t_{p1}$ to allow the user to move the treatment head 3 to zone II ready for the next skincare routine. The LED 17 may be illuminated for the duration of the pause $t_{p1}$ at steps 808, 809 to signify to the user that the treatment head 3 needs to be moved to the next treatment zone.

The parameter Z is then incremented at step 803 and the routine is performed for the next treatment zone. The process repeats until the treatment routines for all of the zones I-IV have been completed after which the process ends at step 810.

However, in use, the skincare device 1 may also be used to perform a skincare procedure including one or more (individual) skincare routines suited to (a) respective zone(s) of the skin of a subject in dependence on the individual treatment head fitted to the drive shaft 5. For instance, the skincare device may be configured to perform the skincare procedure to n skin zones, wherein n is at least 1, even more especially at least 2, such as at least 3, like even more especially at least 4. Hence, the skincare device may be applied with n different treatment heads, with n especially being at least 2. The user may use 2 or more treatment heads, each associated with a specific skin zone. By using a first treatment head and thereafter a second treatment head, a sequence of skincare routines may be applied by the skincare device to the respective zone (when the user brings the skincare device into contact with these different treatment zones. However, alternatively less then n different treatment heads may be used, as the routines may differ for each body zone, but with the same treatment head. Combination of these embodiments may also be possible.

The user may wish to modify the drive parameters for a particular treatment head 3, so as to personalise them for their own use rather than use the default settings held on the RFID tag 15. This can conveniently be carried out using a computer program in the form of an app to be run by a cellular mobile telephone such as a Smartphone or other computing device such as a tablet computer. Referring to FIG. 3, a Smartphone 23 is loaded with an app 24 and can communicate wirelessly with the skincare device 1 through the NFC transceiver 14, although it will be appreciated that Wi-Fi or other alternative means of wireless communication could be used.

Figure 9:
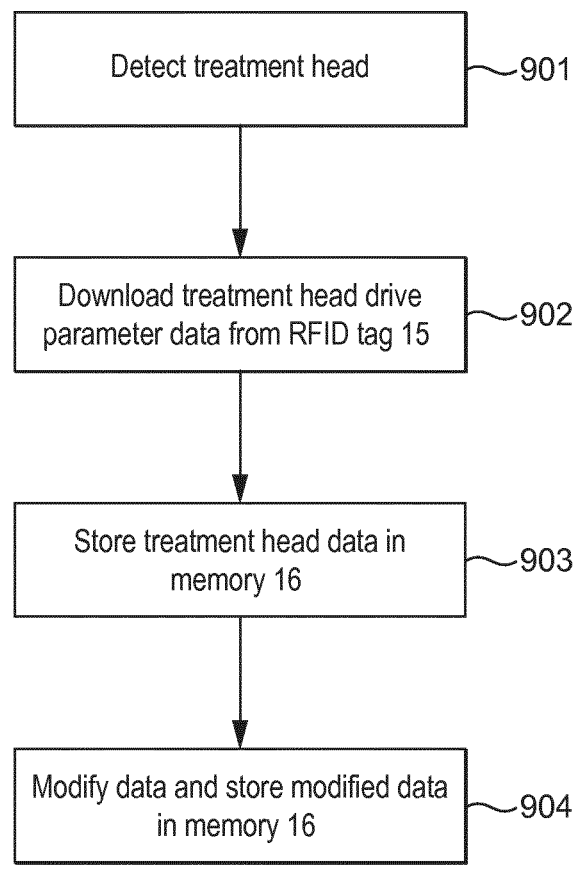
FIG. 9 is a flow diagram for modifying drive parameters for the device.

The app 24 may control the Smartphone 23 to communicate with the microcontroller 10 to perform a process illustrated in FIG. 9. At step 901, the treatment head 3 fitted to the drive shaft 5 is detected by use of the NFC transceiver 14 as previously described, so that the drive parameters for the particular head 3 can be downloaded as shown at step 902 and stored in memory 16 as shown at step 903. The app 24 can then be used to modify the values of drive parameters such as v, t, $t_p$, s, f and fmod for the individual zones, and also additional zones could be defined.

Also, the Smartphone 23 may provide a remote connection for the app 24 for example through a mobile or other wireless network, to a remote data source 25 such as a server, that can provide updates for the routines or new routines for particular treatment heads 3. In particular the drive parameters may be modified to provide:

personal zone time parameters for longer or shorter programs, lower or higher settings for more gentle or more vigorous massage, personal modulation time. This parameter could be used to match and influence breathing frequency and can be optimized for personal breathing frequency, and/or personalized rotation direction of the motor to suit the user's preference. i.e. rotate clockwise or anticlockwise depending on whether right-handed or left-handed.

The app 24 may also provide access to an URL linked to a dedicated website giving attachment-specific information such as a how-to-use video, and where to buy new attachments.

Whilst the described embodiments relate to skincare and particularly facial skincare devices, the invention can be used for other bodycare devices such as toothbrushes and shavers with interchangeable heads.

It will be appreciated that the term "comprising" does not exclude other units or steps and that the indefinite article "a" or "an" does not exclude a plurality. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalisation thereof, whether or not it relates to the same invention as presently claimed in any claim and whether or not it mitigates any or all of the same technical problems as does the parent invention. The applicants hereby give notice that new claims may be formulated to such features and/or combinations of features during the prosecution of the present application or of any further application derived therefrom.

The invention claimed is:

1. A skincare device for performing a skincare procedure on a subject, comprising:
a drive train configured to receive and drive an interchangeable treatment head to perform the skincare procedure, wherein the drive train includes a drive shaft to receive the interchangeable treatment head and a motor configuration to rotate the drive shaft and/or apply a vibratory motion to the drive shaft;
a controller configured to control the drive train so that the interchangeable treatment head performs the skincare procedure; and
a sensor to detect the interchangeable treatment head when fitted on the drive train;
the controller being responsive to the sensor to control the drive train to perform the skincare procedure as different individual skincare routines, wherein each one of the different individual skincare routines is particularly suited to the interchangeable treatment head fitted to the drive train and a corresponding one of a plurality of respective zones of the body of the subject when compared to another one of the different individual skincare routines and another one of the plurality of respective zones for the interchangeable treatment head fitted to the drive train, wherein the different individual skincare routines each include corresponding drive parameters that the controller utilizes to control the interchangeable treatment head fitted to the drive train individually for each of the different individual skincare routines, wherein each one of the plurality of respective zones corresponds to a different physical position of the skincare device on the body, wherein the different individual skincare routines are set in dependence on the interchangeable treatment head fitted to the drive train, and wherein the controller is further operable to control the motor configuration to the drive train for each of the different individual skincare routines wherein the skincare procedure includes a reversal between at least one of the drive parameters of at least two skin care routines that each correspond to a different position on the body, wherein the controller is operable in response to the reversal between the at least one of the drive parameters to change operation of the interchangeable treatment head fitted to the drive train when moved from one of the different positions to another one of the different positions.

2. The skincare device as claimed in claim 1, wherein the controller has an associated memory with stored values for the drive parameters of the different individual skincare routines that are particularly suited to corresponding ones of the plurality of respective zones of the skin of the subject when compared to another one of the plurality of respective zones for the interchangeable treatment head fitted to the drive train.

3. The skincare device as claimed in claim 2, wherein the controller is configured in response to the sensor providing a signal corresponding to the detected interchangeable treatment head, to retrieve the stored values of the drive parameters for the detected interchangeable treatment head from the memory, and control the drive train to perform the different individual routines suited to respective zones of the skin of the subject in accordance with the drive parameters retrieved from the memory for the detected interchangeable treatment head.

4. The skincare device as claimed in claim 1, wherein the sensor is configured to detect wirelessly an identity device on the interchangeable treatment head fitted to the drive train.

5. The skincare device as claimed in claim 4, wherein the sensor includes a near field communication (NFC) device configured to detect a RFID tag on the interchangeable treatment head.

6. The skincare device as claimed in claim 1, wherein the motor configuration comprises a first motor coupled to rotate the drive shaft, and a second motor that comprises a drive coil and a magnetic member configured to impart a vibratory motion to the drive shaft.

7. The skincare device as claimed in claim 1, wherein the drive parameters include a speed and/or a direction of rotation of the drive train for each of the different individual skincare routines with at least one of the speed and the direction changing between the different individual skincare routines for a given interchangeable treatment head.

8. The skincare device as claimed in claim 1, wherein the drive parameters include a frequency and/or an amplitude of the vibratory motion of the drive train for the different individual skincare routines with at least one of the frequency and the amplitude changing between the different individual skincare routines for a given interchangeable treatment head.

9. The skincare device as claimed in claim 8, wherein the drive parameters include a frequency modulation applied to the vibratory motion of the drive train for the different individual skincare routines with the frequency modulation changing between the different individual skincare routines for a given interchangeable treatment head.

10. The skincare device as claimed in claim 1, wherein the drive parameters include a duration of each of the different individual skincare routines with the duration changing between the different individual skincare routines for a given interchangeable treatment head.

11. The skincare device as claimed in claim 1, including at least one of the interchangeable treatment heads.

12. The skincare device as claimed in claim 11, wherein the interchangeable treatment head includes a radio-frequency identification (RFID) tag containing the drive parameters for the drive train for each of the different individual skincare routines that correspond to the interchangeable treatment head fitted to the drive train.

13. The skincare device as claimed in claim 12, wherein the drive parameters are stored in the RFID tag in terms of a maximum value, minimum value and number of transitions between the maximum value and the minimum value to enable control of the different individual skincare routines.

14. The skincare device as claimed in claim 1, wherein the different individual skin care routines are editable or adaptable by a user.

15. The skincare device as claimed in claim 1, wherein at least two of the plurality of respective zones are symmetrically disposed and corresponding drive parameters are of a same amplitude and the change of operation of the interchangeable treatment head fitted to the drive train when moved from one of the different positions to another one of the different positions is a change in direction of rotation.

16. The skincare device as claimed in claim 1, wherein the drive parameters include a direction of rotation for each of the different individual skincare routines and the change of operation of the interchangeable treatment head fitted to the drive train when moved from one of the different positions to another one of the different positions is a change in the direction of rotation between symmetrically disposed positions of the skincare device on the body.

17. A skincare system comprising:
 a skincare device for performing a skincare procedure on a subject, including:
  a drive train configured to receive and drive an interchangeable treatment head to perform the skincare procedure, wherein the drive train includes a drive shaft to receive the interchangeable treatment head and a motor configuration to rotate the drive shaft and/or apply a vibratory motion to the drive shaft,
  a controller configured to control the drive train so that the interchangeable treatment head performs the skincare procedure,
  a memory coupled to the controller and including stored values for drive parameters of different individual skincare routines particularly suited to the interchangeable treatment head fitted to the drive train and a corresponding one of respective zones of the skin of the subject when compared to another one of the different individual skincare routines and another one of the respective zones for the interchangeable treatment head fitted to the drive train, wherein the different individual skincare routines each include corresponding drive parameters that the controller utilizes to control the interchangeable treatment head fitted to the drive train individually for each of the different individual skincare routines, wherein each one of the respective zones corresponds to a different physical position of the skincare device on the body, and
  a sensor to detect the interchangeable treatment head when fitted on the drive train, the controller being responsive to the sensor to control the drive train to perform the skincare procedure in the different individual skincare routines, wherein each one of the different individual skincare routines correspond to one of a plurality of respective zones of the body of the subject, wherein the different individual skincare routines are set in dependence on the interchangeable treatment head fitted to the drive train, and wherein the controller is further operable to control the motor configuration to the drive train for each of the different individual skincare routines; and
 a processor configured to be coupled to the skincare device to control selectively the drive parameters stored in the memory for the interchangeable treatment head fitted to the drive train, wherein the skin care procedure includes a reversal between at least one of the drive parameters of at least two skin care routines that each correspond to a different position on the body, and wherein the processor is operable in response to the reversal between the at least one of the drive parameters to change operation of the interchangeable treatment head fitted to the drive train when moved from one of the different positions to another one of the different positions.

18. The skincare system as claimed in claim 17, wherein the skin care routines are editable or adaptable by a user.

19. The skincare system as claimed in claim 17, comprising a mobile communication device including the processor, wherein the mobile communication device is configured to wirelessly communicate with the skincare device to control selectively the drive parameters stored in the memory for the interchangeable treatment head and/or communicate with a remote data source to update or modify user preferred stored values of the drive parameters.

20. The skincare system as claimed in claim 17, wherein the drive parameters include a direction of rotation for each of the different individual skincare routines and the change of operation of the interchangeable treatment head fitted to the drive train when moved from one of the different positions to another one of the different positions is a change in the direction of rotation between symmetrically disposed positions of the skincare device on the body.

* * * * *